Figure 1:
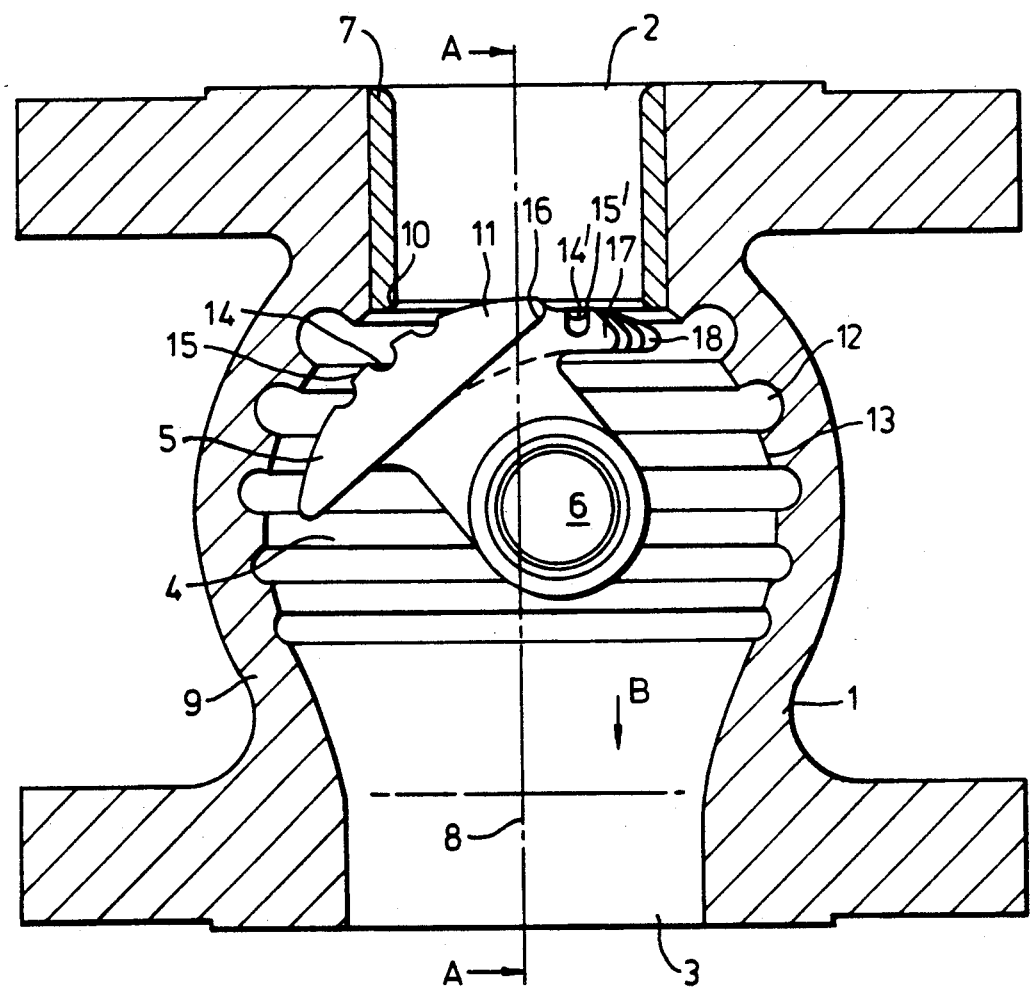

United States Patent [19]
Rohweder et al.

[11] Patent Number: 5,116,019
[45] Date of Patent: May 26, 1992

[54] CONTROL VALVE

[75] Inventors: Reimer Rohweder; Jouni Pyötsiä, both of Helsinki, Finland

[73] Assignee: Neles-Jamesbury Oy, Helsinki, Finland

[21] Appl. No.: 728,377

[22] Filed: Jul. 11, 1991

[30] Foreign Application Priority Data

Jul. 16, 1990 [FI] Finland .................................. 903583

[51] Int. Cl.⁵ .............................................. F16K 47/04
[52] U.S. Cl. ...................................... 251/127; 251/309
[58] Field of Search ...................... 251/309, 127, 304

[56] References Cited

U.S. PATENT DOCUMENTS

| | | |
|---|---|---|
| 3,456,916 | 7/1969 | Ytzen et al. |
| 4,036,470 | 7/1977 | Illing .................... 251/309 |
| 4,037,818 | 7/1977 | Soderberg et al. |
| 4,479,510 | 10/1984 | Bey .................. 251/127 X |
| 4,697,786 | 10/1987 | Kennedy .................. 251/309 |

FOREIGN PATENT DOCUMENTS

| | | |
|---|---|---|
| 0101323 | 2/1984 | European Pat. Off. |
| 2359717 | 5/1975 | Fed. Rep. of Germany |
| 1775888 | 11/1975 | Fed. Rep. of Germany |

*Primary Examiner*—Arnold Rosenthal
*Attorney, Agent, or Firm*—Cushman, Darby & Cushman

[57] ABSTRACT

A control valve, which consists of a body (1) provided with flow-through channels (2, 3) and of a closing member (5) arranged rotatably in the body in an expansion (4) of the channel, the rotation shaft of which is eccentric in relation to the sealing surfaces of the closing member and the seal of the body. In an open position of the valve a circular flow is formed around the closing member between a wall of the body and the closing member (5), the main flow passage of which circular flow is located in a channel between the inner surface of the body and the upstream edge (16) of the closing member. The closing member (5) has an extension (17) in its upstream edge (16) in the open position, which extension in an initial phase of the opening reduces the cross-sectional area of the main flow passage.

7 Claims, 3 Drawing Sheets

CONTROL VALVE

This invention relates to a control valve, which consists of a body provided a flow-through channel and a closing member, which is arranged rotatably in the body in an enlarged chamber of the flow-through channel. The rotation axis of the closing member is eccentric in relation to the sealing surfaces of the closing member and the seal of the body, whereby in an open position of the valve a curved flow is formed, between a wall of the body and the closing member, of which the main flow is located in a channel between the inner surface of the valve body and the upstream edge of the closing member. The present rotary plug valves have a poor characteristic curve (i.e. the flow volume of the medium in relation to the angle of opening) regarding adjustability, because the increase of the effective flow cross-sectional area of the main flow passage as a function of the opening is not affected. In addition to this, rotary plug valves at the market have poor cavitation properties.

In order to throttle the medium flow flowing through the valve and to reduce noise and cavitation, it is known to use different kinds of perforated baffle plates attached in the closing member. This kind of construction in for example a closing member in form of a spherie calotte is described in for example FI-patent publication 70744.

The objective of this invention is to improve the flow properties of the valve in a manner simpler and more effective than used before. According to the invention, when the valve is in an open position, the closing member has an upstream edge relative to the flow through the valve with an extension extending from it, such that when the valve is initially opened, the extension reduces the cross-sectional area of the main flow passage of the closing member. The closing member of the valve can be a rotary plug, an eccentric spherie segment or a crosscut of a segment or an eccentric cylinder or cone plug segment or a crosscut of a segment.

The inner surface of the body is shaped so that the flow cross-section between the inner surface of the body and the closing member changes as a function of the opening in a desired manner.

The extension in the edge of the closing member may be toothed so that the jet is divided in several smaller jets, whereby the intensity of the jets decreases. This reduces noise and cavitation.

The forming of the main flow passage is preferably carried out so, that the total flow cross-sectional area follows the equation below:

$$A_{vir} = \sqrt{\frac{1}{\frac{N_1^2 \cdot \mu^2 \cdot [1 + h^2 \cdot (DP_f - 1)]}{h^2 \cdot C_{vf}^2 \cdot DP_f} + \frac{1}{A_p^2}}}$$

whereby $N_1$ = quality modification coefficient
$\mu$ = correction coefficient, which takes constriction of the flow in flow opening into consideration
$h$ = relative aperture of the valve
$C_{vf}$ = capacity coefficient of a fully open valve
$A_p$ = flow cross-sectional area of income side
$DP_f$ = characteristic coefficient of the process pipework $$DP_f = \frac{\Delta P_f}{\Delta P_o} = \frac{\text{pressure difference, fully open}}{\text{pressure difference, fully closed}}$$

When the change in flow cross-sectional area in relation to the relative opening follows this formula, adjustability of the valve in the whole range of the opening thus improves, i.e. the whole opening is used for adjusting. With help of the formula it is found, how the flow cross-sectional area is to be changed as a function of the opening in order for amplification of the valve installed to be constant. There is thus a linear connection between the volume flow flowing through the valve installed in the pipework and the opening of the valve, when pressure loss in the pipework is taken into consideration.

The special shaping of the closing member and the body of the valve according to the invention does not cause any extra expenses, because it can be carried out by casting.

Figure 2:
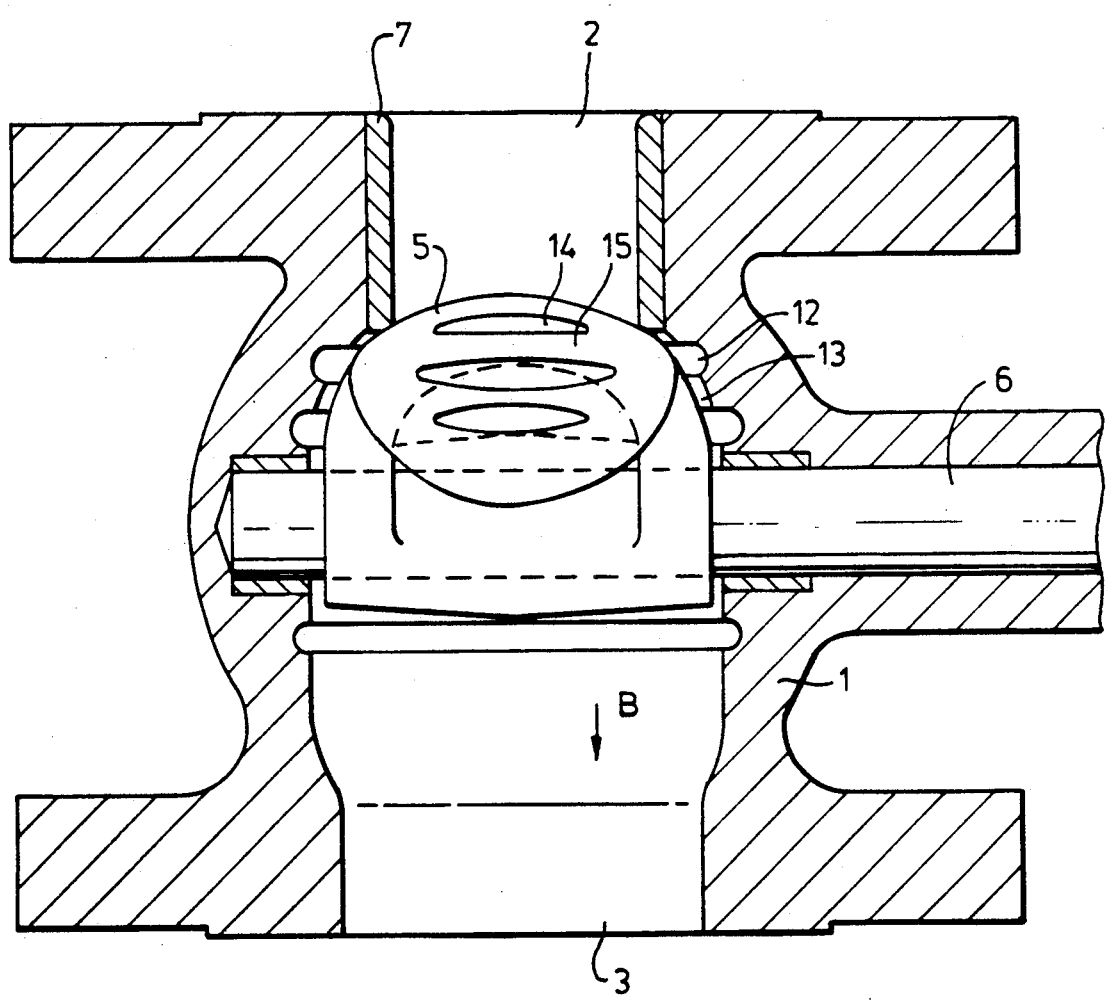
Figure 3:
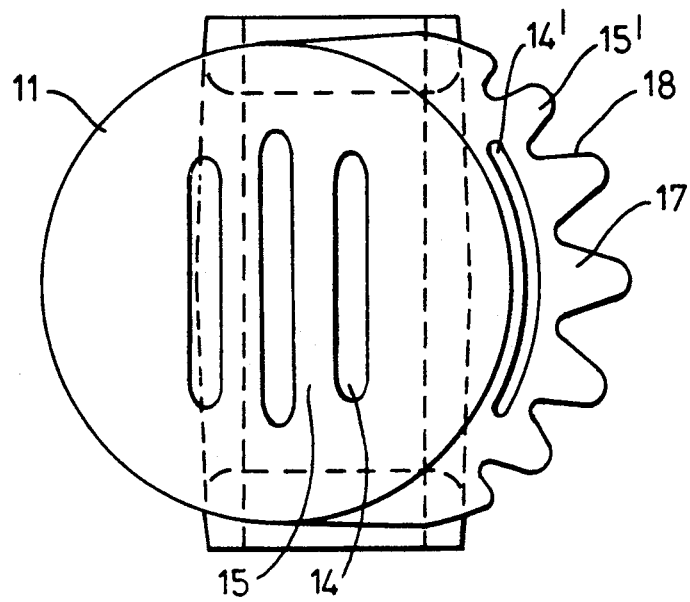
Figure 4:
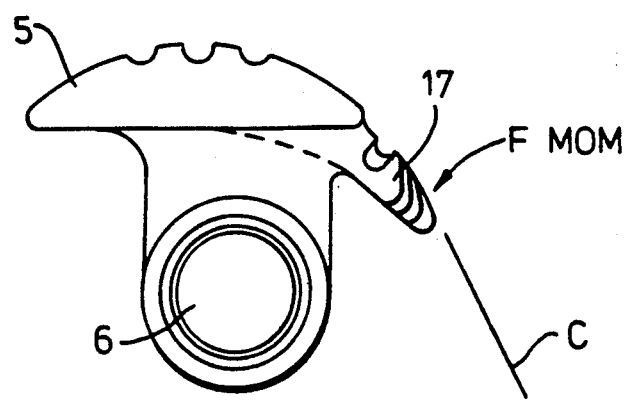

The invention and its details will be described in more detail in the following with reference to the accompanying drawings, whereby:

FIG. 1 shows a valve according to the invention cut in a plane perpendicular to the rotation shaft, FIG. 2 shows a section A—A of FIG. 1, FIG. 3 shows a member device of the valve alone, seen from the closing surface side and FIG. 4 shows the closing member seen in the direction of the rotation shaft.

In the valve there is a body 1, in which there is a flow-through channel 2. The flow direction is indicated by the arrow B. In the embodiment shown in the drawings, a sphere segment or calotte 5 is arranged in the chamber 4 of the body as a closing member, to which a rotation shaft 6 projecting through the body is connected. There is a closing seal 7 between the body and the closing member. The flow normally comes from the side of the seal 7 and meets the curved throttling area, which is adjusted by changing the opening angle of the closing member 5.

The rotation shaft 6 is located eccentrically in relation to the centre line 8 of the flow-through channels 2 and 3 in a manner, that the distance of the rotation shaft from the body half 9, which is located on the other side of the plane passing via the centre line 8 and parallel to the rotation shaft 6, is bigger than from the sealing surface 10 of the seal 7. In a closed position the closing member 5 settles against the sealing surface 10 of the seal 7, whereas in an open position the closing surface 11 of the closing member stays at a distance from the above mentioned body half 9. In an open position there is thus formed a circular flow passage around the closing member on the side of the closing surface 11 of the closing member and on the side of the rotation shaft 6.

In that edge 16 of the closing member 5, which comes behind when opening the valve, i.e. stays on the upstream side in an open position, there is an extension or a protrusion 17. There are comb-shaped cuts 18 in the edge of the extension. The purpose of the comb-shaped extension is in an initial phase of the opening to reduce the cross-sectional area of the flow passage on side of the rotation shaft. There are grooves 14 and between them ridges 15 in the extension 17. Direction of the grooves 14 is such, that in an open position they are transverse in relation to the flow direction thus forming sequential extension and throttling areas in the flow passage on the side of the body half 9. In the closing surface of the closing member 5 there are grooves 14' similar to the grooves 14 in the extension.

In an open position of the valve the pressure of flow medium creates a dynamic moment having influence on the closing member. Magnitude of this moment in the valve according to the invention can be influenced by the shaping of the outer surface of the extension 17 of the closing member. By changing the direction C of the outer surface of the extension 17 in the closing member in a plane perpendicular to the rotation shaft 6, the direction of the arm of the force $F_{mom}$, which creates the moment, changes and thus the magnitude of the moment changes as well (FIG. 4). Thus when producing the valve, a suitable direction of the outer surface of the extension can be chosen and thus the moment can be affected.

The invention is not limited only to the embodiment described above, but it can vary in different ways within the limits of the claims. The closing member can be not only a sphere segment or a cut of the segment, but also a cylinder or cone segment or a cut of the segment.

The flow passage on the side of the closing surface of the closing member can be created not only by means a rotation shaft located eccentrically as described above, but also by a suitable shaping of the inner surface of the expansion 4 in the body.

Grooves 14' in the closing member are not necessarily needed. Also grooves 14 in the extension 17 can be omitted. The cut or cuts 18 in the extension can also be replaced by perforation or omitted. Instead of grooves and ridges also other kinds of recesses and protrustions can be used in order to create expansion, and throttling areas.

We claim:

1. A control valve comprising a body having a flow-through passage with an interior surface and a center line therethrough, an enlarged chamber with an interior surface and disposed along said flow-through passage, and a closing member, said closing member having an edged closing surface and said passage having a seal, wherein flow enters said body through a first end of said passage and passes through said chamber and exits said body through a second end of said passage opposite said first end, said closing member being disposed in said chamber for rotation about an axis between a closed position where said closing surface of said closing member sealingly abuts said seal of said passage so that said flow through said passage is prevented, and an open position where flow through said passage is permitted, said axis of said closing member being disposed eccentrically and perpendicularly to said center line of said flow-through passage, whereby in said open position of said control valve a curved flow path is formed between said interior surface of said chamber and said closing member, said flow path including a primary flow path defined between said closing surface of said closing member and said interior surface of said chamber, wherein said closing member has an upstream edge and said upstream edge of said closing member, relative to the flow through said valve when said valve is in said open position, is provided with an edged extension extending therefrom which, when said valve is initially opened, reduces the cross-sectional area of said primary flow path.

2. A control valve as in claim 1, characterized in that the outer edge of the extension (17) extending to the flow passage in an initial phase of the opening has a cut or cuts (18).

3. A control valve as in claim 1, characterized in that by the shaping or the direction (C) of the extension (17) surface facing the flow, a dynamic moment caused by pressure distribution $F_{mom}$ on the surface of the closing member (4) is reduced.

4. A control valve as in claim 2, characterized in that there are sequential expansion or throttling areas in the outer surface of the closing member (5) formed by one or several recesses and protrustions, e.g. by grooves (14') and ridges (15').

5. A control valve as in claim 4, characterized in that the grooves (14') and ridges (15') of the closing member (5) are located in a closed position on the closing member in the outer surface (11) facing the flow in an area, which in a closed position stays inside of the sealing circle (10) between the closing member and the body, and in an open position form sequential expansions and throttling areas in the flow passage, and that the height of the closing member ridge (15') does not exceed the height of the outer surface of the corresponding closing member with smooth surface.

6. A control valve as in claim 5, characterized in that the flow cross-sectional area changes as a function of an aperture according to the following formula:

$$A_{vir} = \sqrt{\frac{1}{\frac{N_1^2 \cdot \mu^2 \cdot [1 + h^2 \cdot (DP_f - 1)]}{h^2 \cdot Cv_f^2 \cdot DP_f} + \frac{1}{A_p^2}}}$$

wherein
$N_1$ = quality modification coefficient
$\mu$ = correction coefficient, which takes constriction of the flow in flow opening into consideration
$h$ = relative aperture of the valve
$Cv_f$ = capacity coefficient of the fully open valve
$A_p$ = flow cross-sectional area of income side
$DP_f$ = characteristic coefficient of the process pipework $$DP_f = \frac{\Delta P_f}{\Delta P_o} = \frac{\text{pressure difference, fully open}}{\text{pressure difference, fully closed}}.$$

7. A control valve as in claim 2, characterized in that at least one groove (14) and at least one ridge (15) is formed in said extension (17) so that, when said valve is in said open position, said at least one groove and said one extension opposingly face said interior surface of said chamber (4), said at least one groove and ridge forming sequential extension and throttling areas in the curved flow path when said valve is in an open position.

* * * * *